(12) United States Patent
Kainen

(10) Patent No.: US 6,843,009 B2
(45) Date of Patent: Jan. 18, 2005

(54) LENTICULAR FOLDING CARD, CARD CASE, AND BOOK

(76) Inventor: Daniel B. Kainen, 137 Varick St., New York, NY (US) 10013

(*) Notice: Subject to any disclaimer, the term of this patent is extended or adjusted under 35 U.S.C. 154(b) by 111 days.

(21) Appl. No.: 10/002,018

(22) Filed: Nov. 15, 2001

(65) Prior Publication Data

US 2003/0154637 A1 Aug. 21, 2003

Related U.S. Application Data

(60) Provisional application No. 60/252,192, filed on Nov. 21, 2000.

(51) Int. Cl.[7] ............................................. G03B 25/02
(52) U.S. Cl. ........................................ 40/454; 40/491
(58) Field of Search .......................... 40/454; 359/619; 446/150

(56) References Cited

U.S. PATENT DOCUMENTS

| | | | | |
|---|---|---|---|---|
| 1,855,822 A | * | 4/1932 | Cahn ........................... | 446/150 |
| 3,660,919 A | * | 5/1972 | Nagel ........................... | 40/491 |
| 5,757,545 A | * | 5/1998 | Wu et al. ..................... | 359/463 |
| 6,070,350 A | * | 6/2000 | Fantone et al. ............... | 40/454 |
| 6,357,153 B1 | * | 3/2002 | Gelardi et al. ................ | 40/454 |
| 6,366,407 B2 | * | 4/2002 | Rivera et al. ................. | 359/619 |
| 2002/0095835 A1 | * | 7/2002 | Vanderburg .................. | 40/491 |

\* cited by examiner

*Primary Examiner*—Joanne Silbermann
(74) *Attorney, Agent, or Firm*—Jay H. Maioli

(57) ABSTRACT

A picture book, folding card, or card-case, and modifications for larger displays, all of which show film-like animation, as well as other types of lenticular images, and all of which include embodiments allowing interchangeable images, as well as accommodating standard computer-printer print-outs, which have been made with accompanying software. In each case, a mechanical advantage is provided to effect relative motion between image and overlaying lenticular screen. The images can also be three-dimensional, or any one of many other, well-known lenticular image-types. Various methods of achieving mechanical advantage, and translation of motion-direction and type are shown, as well as different materials, and manufacturing techniques. Such a family of devices can be used as greeting, or novelty cards, educational or informational books, advertising premiums and displays, and can be wall mounted and/or motor-driven.

9 Claims, 14 Drawing Sheets

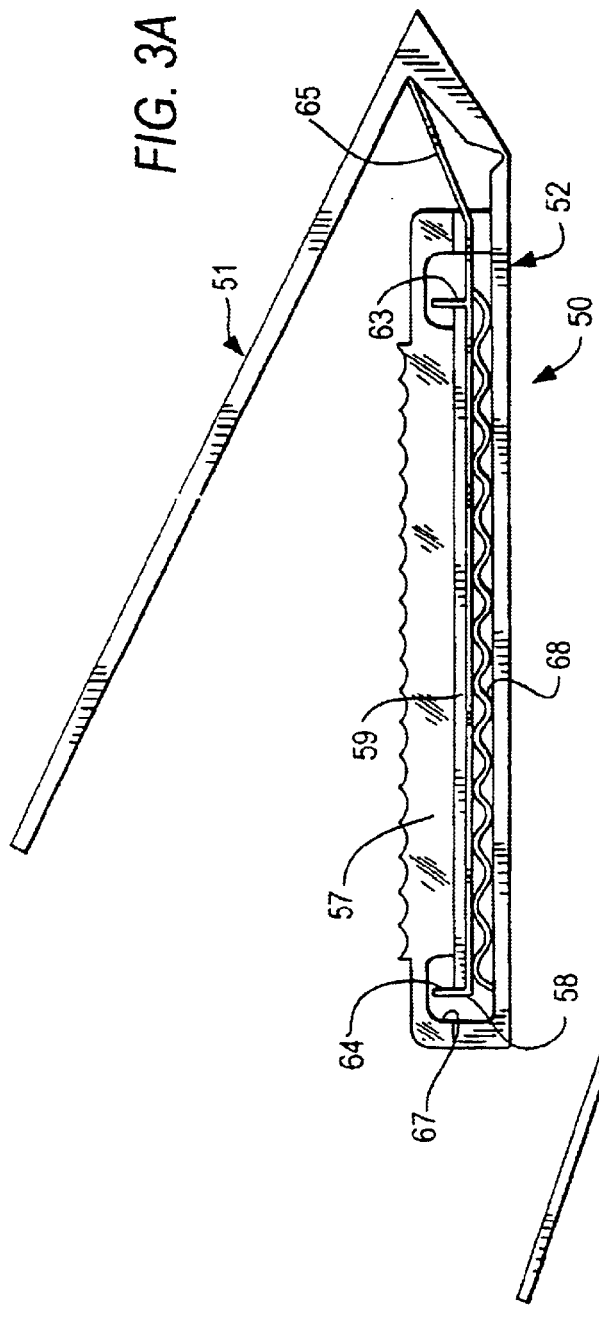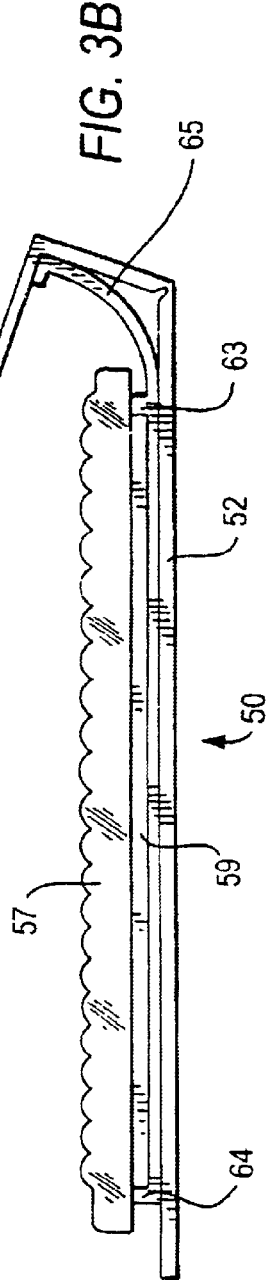

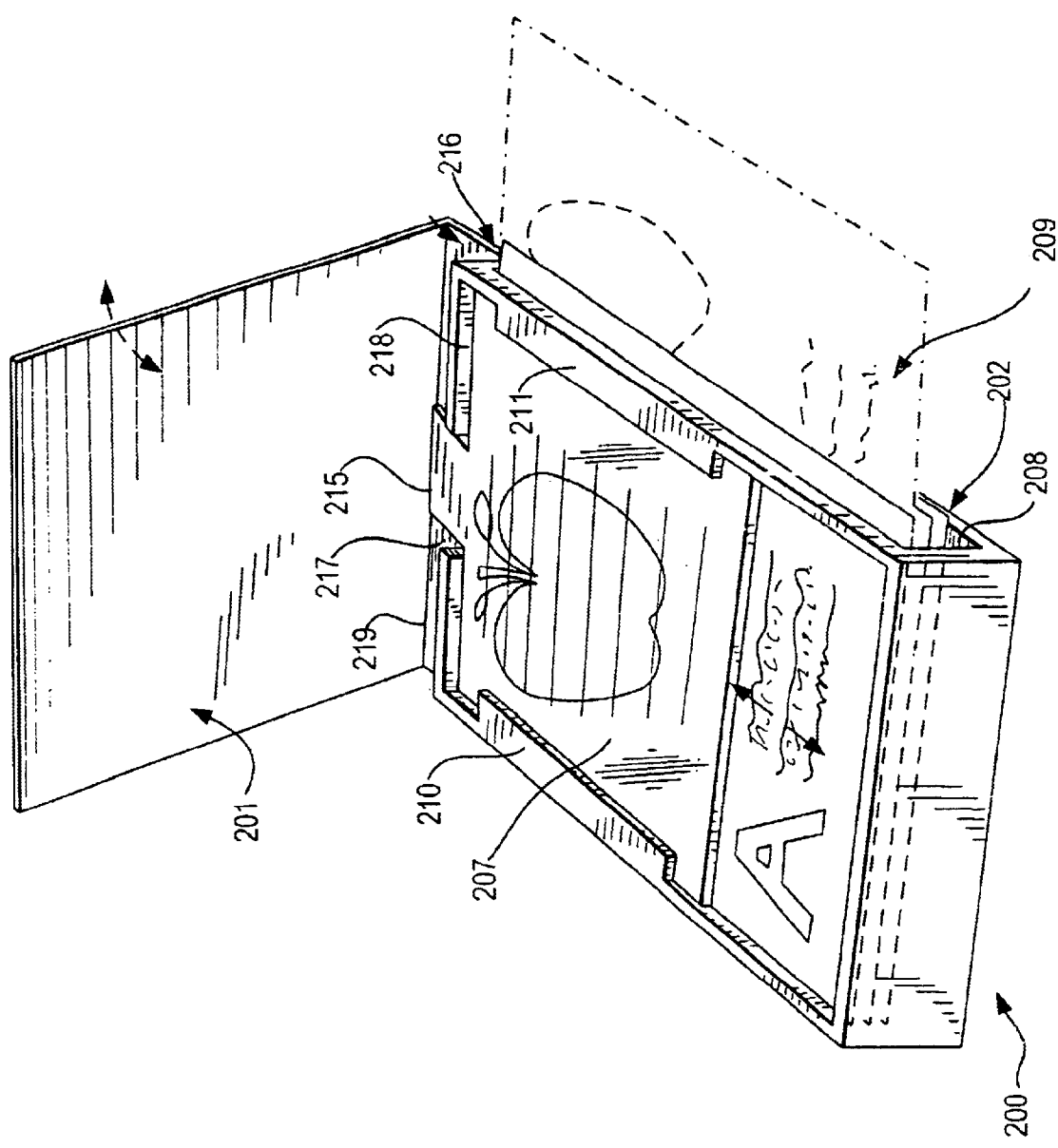

LENTICULAR FOLDING CARD, CARD CASE, AND BOOK

CROSS-REFERENCE

This application claims the benefit of U.S. Provisional Application No. 60/252,192, filed Nov. 21, 2000.

FIELD OF THE INVENTION

This invention relates generally to lenticular displays and viewers, and more specifically those displays and viewers which create relative motion between a print and its overlaying lenticular screen, in order to shift the optical axis of an observed image. The invention also relates to replaceable image displays, and to creating lenticular images on available computers and printing them with available printers, as well as downloading, e-mailing, and otherwise sending such images over electronic media.

BACKGROUND OF THE INVENTION

For decades, toys and displays have employed motion between slits, screens, and images behind them. Since the 1930s, advertising displays have used continuous belts of alternating clear and black lines, scrolling in front of backlighted, interleaved images. Pop-up greeting cards and books have displayed images, which are pulled through openings to be revealed as the card or book is opened. Post cards printed with a lenticular image are made with an overlaying clear sheet with black lines attached by an eyelet, such that when the clear sheet is swivelled, the image underneath appears to move. Regarding lenticular imaging, the concept of creating image change, and film-type animation, by relative motion between the print and overlaying screen is well known in the art. However, it is useless without making adequate provisions for several accompanying concepts, vital to accomplishing this relative print-screen motion in a truly effective manner. Previous art has ignored some or all of these concepts, which are: (1) proper choice of whether to move a print or screen element, since it is not equivalent to move either, as certain conditions prohibit, or enhance motion of one or the other; (2) co-planarity of print and screen, which in most cases necessitates close contact between the entire area of print and overlaying screen; (3) mechanical advantage through a user-friendly interface, for precise, even, movement of screen or print; (4) ease of image replacement; (5) end user printing option and low cost software for mastering and printing of lenticular images with widely available computers and printers, as well as a file format which includes pertinent information to a lenticular file, such as lenses per inch, and number of compressed images; (6) accommodation of standard computer printer media sizes for consumer-printed images, such as index cards, or letter size; (7) reduction of friction between print and screen, even for user-printed images; and (8) option of adjusting co-linearity between print and screen.

Simply to prescribe sliding a print or screen to obtain an effect of motion, while not paying close attention to the above criteria, will result in a device incapable of a truly effective and practical display.

Close contact between the entire surface of the print and overlaying screen is necessary for very sharp focus, as simply placing a print against a lenticular screen will still show flatness discrepancies between their two planes as blurry areas. A rigid screen is needed to apply enough pressure against the print and its backing, and blurry areas still show up, due to lack of adequate contact between print and screen since, if the image and screen are gripped at their edges, their centers tend to bow away from each other. Because of reflections, it is not practical to apply pressure with an additional, rigid piece of clear plastic in front of the lenticular screen, unless backlighted.

U.S. Pat. No. 5,695,346 to Sekiguchi, shows a barrier or lenticular lens screen attached, in a first case near to, and in a second case, slightly farther from the hinged edge of the opening flap of a greeting card. The first case does not provide for proper screen trajectory, and the second case, because of the distance between print and screen, is not practical for the use of anything but a barrier strip, which suffers from lack of adequate light. The first case also, in which a lenticular screen moves over the print, is self-defeating, since greeting cards are usually opened by grasping the back flap of the card between thumb and fingers, which would inhibit screen-motion. Nor is there any design, in the lenticular lens version, offered to keep print and screen co-planar, so that even if the print could move freely, the hinged edge of the screen would lift up and away from the print as the card was opened, destroying co-planarity and putting the image out of focus.

Another drawback to existing devices is the lack of any type of adjustment for co-linearity between the lenticular image and the lenticules of its overlaying screen, which would become especially useful if an image became worn at its edge over time, or did not print exactly straight, or if a smaller lens-per-inch size were used, requiring more exact parallelism.

In addition, even for industrial, not to mention consumer use, the price of mastering lenticular images can be prohibitive. There is a need for a widely compatible, easy to use, low cost software, enabling mastering and printing of lenticular images with widely available computers and printers, as well as a file format containing pertinent information to a lenticular image, such as lenses per inch and number of compressed images, for downloading over electronic media.

Finally, there must be a means for reducing friction between print and screen, unless they are to be spaced apart, which requires extreme planar uniformity, whether flat or curved. Such uniformity is possible with a small image or where larger lenses, or those with longer focal lengths, are used, making their focal distance less critical. "Stiction", that is, in this case, the tendency of the printed image to stick against the overlaying screen, until the friction between them breaks, will create an intermittent motion, rather than a smooth one, which is necessary for film-quality animation.

SUMMARY OF THE INVENTION

The present invention, therefore, seeks to improve the state of the art, by creating lenticular display devices, which combine all of the following aspects: (1) proper choice of a moving element; (2) fine control of motion by a user-friendly interface, between the print and overlaying screen; (3) close contact between the print and overlaying screen; (4) reduction of friction between print and screen, for either pre-printed (applied during manufacture), or computer-printer images (consumer-applied); (5) ease of image replacement; (6) accommodation of standard, computer printer media sizes; (7) a low cost software for mastering and printing of lenticular images with widely available computers and printers, as well as a file format which includes pertinent information to a lenticular file, such as lenses per inch, and number of compressed images; and (8) ease of adjusting co-linearity between print and screen.

In the following description, the term "folding card" is used primarily to describe the format of the described device, rather than limit its description to any one size, or size-related use, such as a greeting card. For example, the folded lenticular card can be in the form of a display that is much larger than a standard greeting card and can be wall mounted and/or motorized for display advertising, or home recreational use.

The foregoing objects are achieved and the disadvantages of the known lenticular display devices are overcome by providing lenticular display devices in accordance with the present invention.

The folding card display comprises a front flap; a back flap hinged to the front flap; a lenticular screen; a first side spacer, a second side spacer and a bottom spacer secured between the screen and an inner surface of the back flap, whereby a flat sleeve is formed; and a printed lenticular image card positioned in the sleeve and attached to an inner surface of the front flap, whereby when the front flap is opened, the image card is pulled underneath the lenticular screen. The flap may be opened by a user or a motor. The spacers have at least the same thickness as the image card and may be molded into the lenticular screen. The folding card display also includes an opening at the center of the bottom spacer for accepting a rectangular section from the image card.

A center portion of a top edge of the image card is attached to the inner surface of the front flap and top spacers are secured to the inner surface of the back flap and positioned on either side of the center portion. The top, bottom and side spacers can also be molded into the lenticular screen. Several or more folding card displays may be glued together to form a book; the outer bottom flap of one card may be glued to the outer top flap of the next forming a continuous series of pages.

The lenticular folding card display which allows for replacement of lenticular images, comprises a front flap; a back flap hinged to the front flap; a lenticular screen; a side spacer and a bottom spacer secured between the lenticular screen and an inner surface of the back flap, whereby a flat sleeve is formed; and a thin sliding tray, for housing a replaceable image card, positioned in the sleeve and attached to an inner surface of the front flap or a handle, whereby when the front flap is opened or the handle is turned or squeezed, the tray is pulled underneath the lenticular screen. The flap can be opened or the handle operated by either a user or automatically with a motor. The tray includes one open side to allow insertion and removal of the replaceable image card and a top wall, a bottom wall and a side wall to secure the replaceable card. The top or bottom wall is spring loaded to push the edge of the replaceable image card against the opposing wall.

A center portion of a top edge of the tray is attached to the inner surface of the front flap. Top spacers are secured to the inner surface of the back flap and positioned on either side of the center portion. The side, bottom and top spacers can also be molded to the lenticular screen.

The lenticular book comprises a front flap; a back flap hinged to the front flap; a lenticular screen; a side spacer and a bottom spacer secured between the lenticular screen and an inner surface of the back flap, whereby a sleeve is formed; and a deep sliding tray, for housing a plurality of replaceable image cards, positioned in the sleeve and attached to one of an inner surface of the front flap or a handle, whereby when the front flap is opened or the handle is turned or squeezed, the tray is pulled underneath the lenticular screen. The front flap can be opened or the handle operated by either a user or automatically with a motor. The tray includes one open side to allow insertion and removal of the replaceable image cards and a top wall, a bottom wall and a side wall to secure the replaceable cards. The top or bottom wall can be spring loaded to push the edges of the replaceable image cards against the opposing wall.

A center portion of a top edge of the tray is attached to one of the inner surface of the front flap or to the handle. Top spacers are secured to the inner surface of the back flap and positioned on either side of the center portion. The side, bottom and top spacers can be molded into the lenticular screen.

A method of manufacturing a folded lenticular card comprises the steps of die-cutting a five-panel piece of material; folding and glueing together a first set of two adjacent panels to create a front flap; folding and glueing together a second set of two adjacent panels to create a back flap; separating the front and back flaps by a rectangular spine; hinging a fifth panel, printed with a lenticular image, at an inner bottom portion of the front flap; attaching a lenticular screen around the edges of the fifth panel; and mating a protrusion from the bottom of the lenticular screen with a corresponding female shape cut into the fifth panel. The size of the panels may be made so that they are the same as a CD/DVD case or mailer, or the CD/DVD mailer may be engineered into the die-cut panels by adding additional panels, flaps, etc. to either the top or bottom flaps, to contain the CD/DVD. Such a packaging technique may be used for videotapes, video game boxes, digital camera boxes, and other boxes and containers, in book or card case embodiments.

Tray trajectory may be finely controlled by the use of ball bearings. A single ball at each corner of the tray may ride in a short ball race, since the translation distance is quite small. Thus, no cage is required as with multiple balls, and the ball races may be molded into the tray and bottom flap walls, such that the size of the tray, and the natural, slight elasticity of the assembly, is just enough to trap the ball with a sufficient preload, between the tray and bottom flap wall. In manufacture, the ball may be held in place, and the frame snapped into position.

In any of the book, card-case, or folding card embodiments, the hinged cover may translate its motion at right angles, so as to be opened from the left or right, and not interfere with the light illuminating the card interior. The hinged cover may be made by other means, including injection-molding, as well as die cutting. The cover can also be made transparent, or removable, thereby leaving a smaller plane or stick that interferes with less light than the cover would when held half open and in the case of the book, operates in a less cumbersome manner than by flapping the whole cover. If the cover is removed and a smaller plane 8 is used, it need only be as large as the section between the print/tray and the bottom flap, and may be duplicated at the opposite end of the bottom flap, forming a parallelogram comprised of the two opposing small planes, and the larger planes of the print/tray and the bottom flap, thereby greatly enhancing the straightness of motion of the print/tray. This is especially useful with larger images, and facilitates motorization. Also, the screen may cover only a portion of the entire page, which may protrude from the book, or a portion of the screen may be left clear, with no lenticules, so that a copy may be easily read from the page. Either the replaceable, or non-replaceable folding cards may be made with their back flap translucent or transparent to accommodate transparent images.

For the above embodiments, provisions for motorization may be optionally added, so that the device may be placed upon a stand with a motor, which would move the cover or handle automatically, or bypass the hand-operated parts by inserting its motor-driven, shaped shaft, which fits an interior part, to effect relative motion between screen and print. In this way, a book may be placed on a motorized stand manufactured to mate with the book, and viewed in motion, with no action on the part of the user. Such a motorized stand would be effective for lectures, classrooms, homes, or advertising displays.

A software application to create lenticular images consists of a method to choose any number of image files, from drive and directory, and a method to enter the chosen images into an image list, such as double clicking the computer mouse. As each image's filename is entered into an image list, an on-screen image box displays the current image. As the mouse is moved with its left button held down over each filename in the image list, that image is displayed in the image box, creating a sequential display very helpful in assessing how well the images will look when merged, whether for animation, 3D, or other types of images. Images may be removed from any spot in the image list without leaving a gap.

Alignment of successive images to be merged must sometimes be modified from an original film sequence, to create a smooth animation or to change the "key" image-plane in a 3D image, and therefore the images in the image box may be manipulated to align all to a common point in each image. Aligning to two points will fix the rotational angle of the images, as well. Alignment may be accomplished by indicating a point or points in one image, and creating artificial intelligence to recognize those points in the other images, or by indicating corresponding points in all the images.

Once aligned, some parts of the images may not be needed, so a cropping feature is included, so as not to show the unwanted areas, and to save file space.

The software also allows choice of lenses per inch, pixels per inch of the final, merged image, and the final, merged image size. To make the program easier to use, the final pixels per inch are computed automatically by multiplying the number of lenses per inch by the number of images, and that product is suggested to use as an appropriate choice for the pixels per inch number. Should the user choose another number for pixels per inch, a warning will be displayed, saying that to use less than the suggested number may degrade the image quality, but leaving the option to enter any number. Should the user attempt to merge the images without entering a number for lenses per inch or number of images, a reminder will show on-screen to enter these numbers.

Once the image is merged, the image box will show the merged image, and the filename beneath it will read "render", or the like, and the user may change this filename, as well as the directory and drive to which the file is saved. The image may be printed directly from the software program, whether saved or not.

For merged lenticular files, it is useful to know how many images were merged, and the number of lenses per inch they were merged for. Therefore a file suffix is created, which is recognized by the program, and the information, which is included in the merged file, is displayed. This information is useful in scaling a merged image up or down, to match a different number of lenses per inch., To send the image over electronic media, such as the Internet, the file may be compressed, so long as the image size does not change. Compression along the long axis of the lenticules, or using a lossless compression will not sacrifice separation of image-lines behind each lenticule.

BRIEF DESCRIPTION OF THE DRAWINGS

The features and advantages of the invention will become apparent upon review of the following detailed description of the preferred embodiments, taken in conjunction with the following drawings, in which:

FIG. 3 shows a side view of a replaceable-image folding card according to a second embodiment of the present invention;

FIG. 6 shows a lenticular card/book case according to a fourth embodiment of the present invention;

DETAILED DESCRIPTION

Figure 1A:
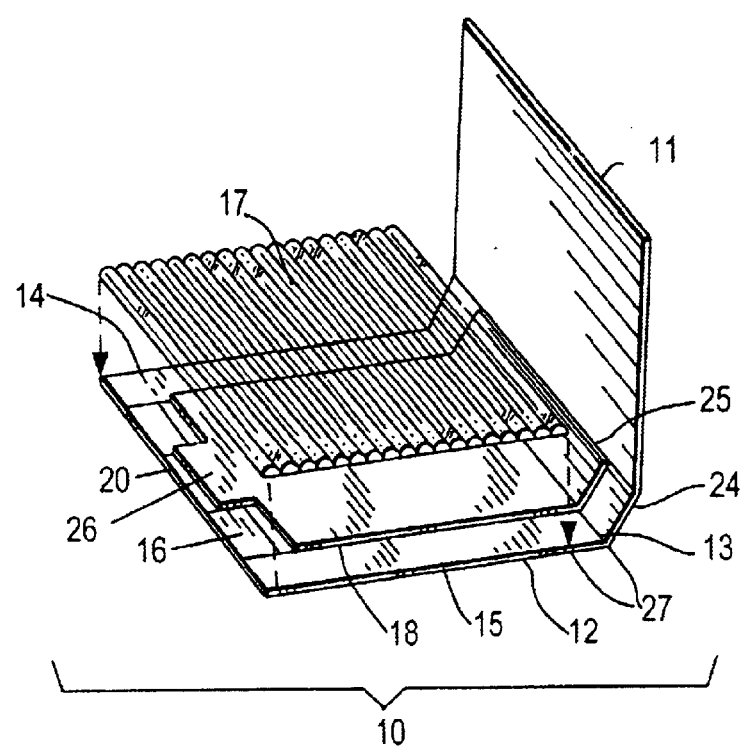
FIG. 1 shows a folding card display according to a first embodiment of the present invention.
Figure 1B:
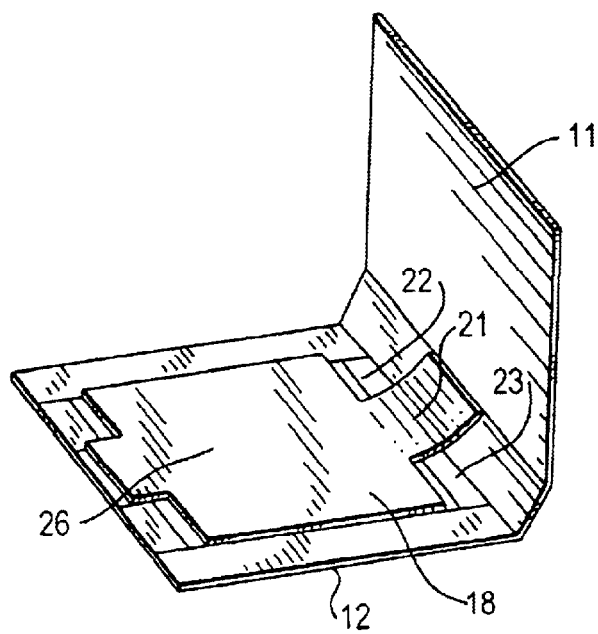
Figure 1C:
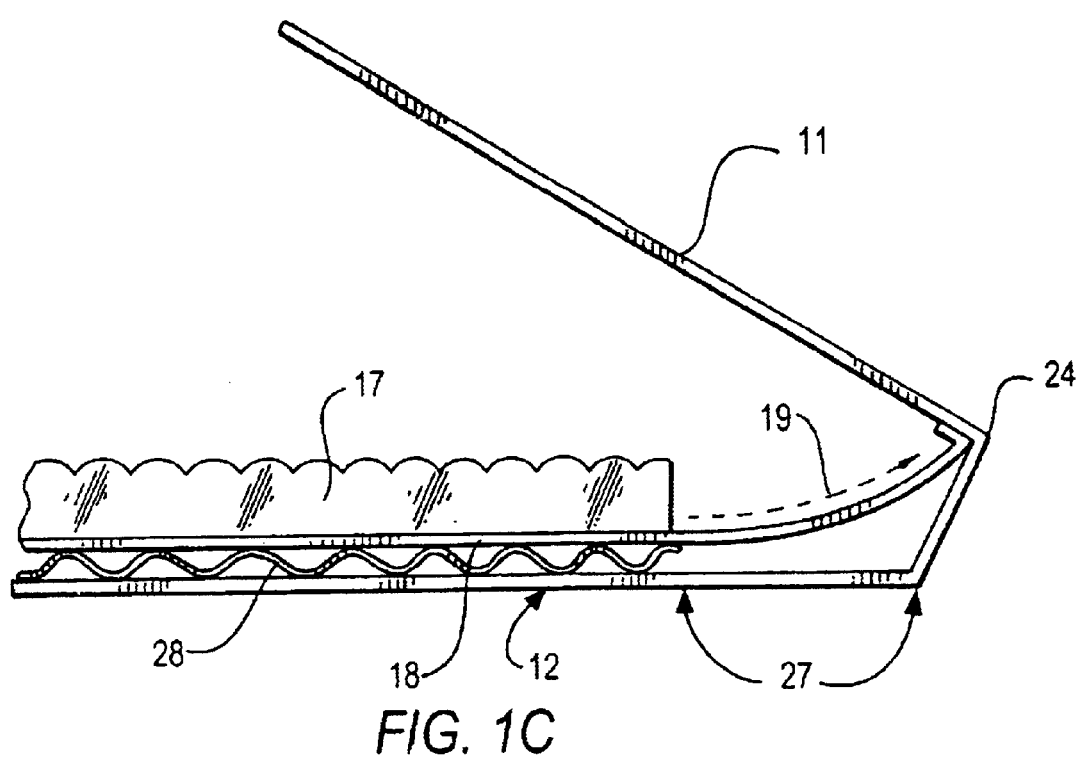
Figure 1D:
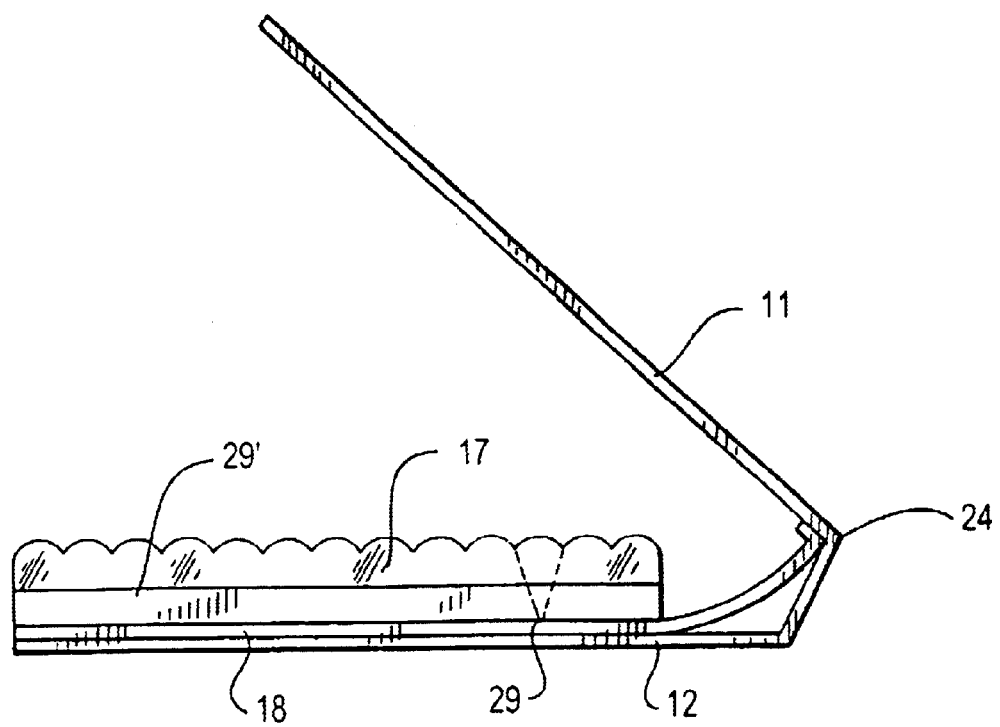
Figure 2A:
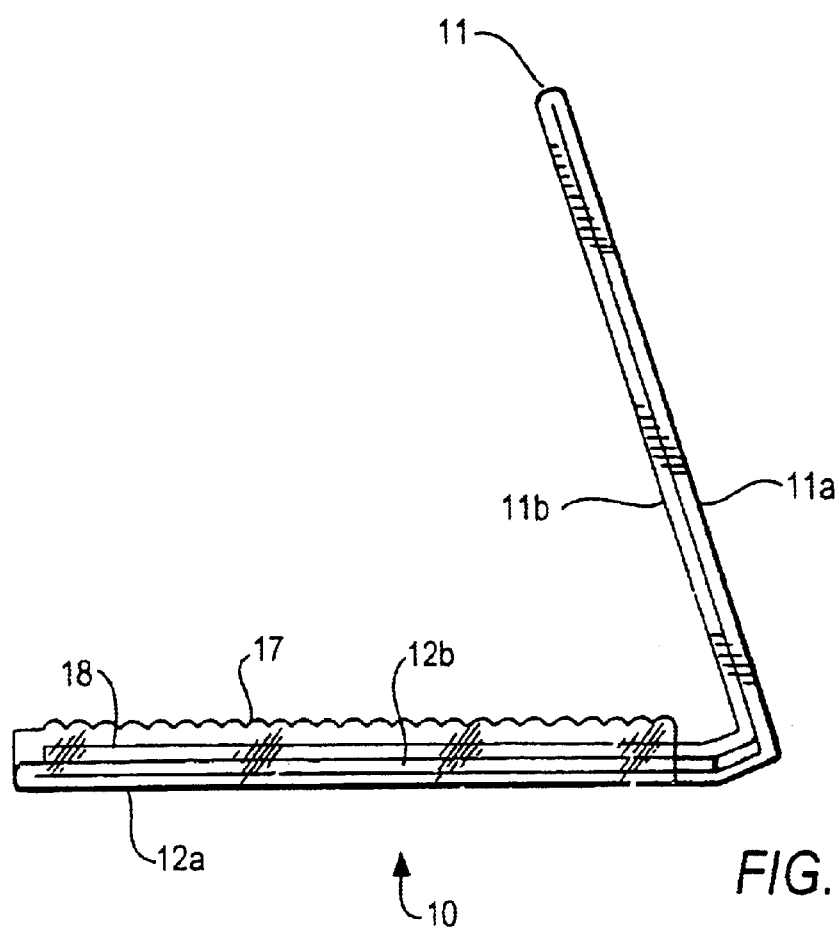
FIG. 2 shows a folding card display and a die-cut panel according to a first embodiment of the present invention.
Figure 2C:
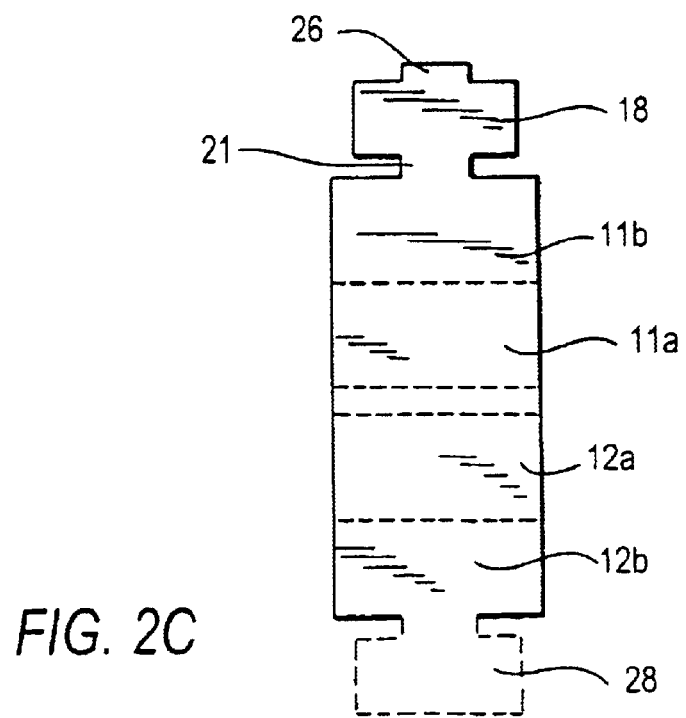

As shown in FIGS. 1 and 2, in one embodiment, a folding card display 10, made of paper, plastic, or the like, is comprised of a front flap 11, and a back flap 12, which are hinged together 13 at the top of the card. Parallel to the plane of the inner surface of the back flap 12, a lenticular screen 17 is attached by spacers at both sides 14, 15 and the bottom 16 of the card, leaving the top edge open, so as to form a flat sleeve, through which may slide a printed, lenticular image-card 18, whose surface is at the focal plane of the lenticular screen 17. This image-card's 18 top edge is attached to the inner side of the front flap of the folding card display 10, at a point 25 near its hinge-point 13, so that when the card is opened, the image-card 18 is pulled underneath the lenticular screen 17, whose lenticules' long axis is perpendicular to the direction of motion 19 of the image-card 18. The spacers 14, 15, 16 are at least as thick as the image-card 18, and also serve to straighten the trajectory of the print 18 as it moves. The spacer 16 at the bottom edge of the inner back flap may have a gap 20 at its center to accept a blank, protruding rectangular section 26 from the image, and thereby providing additional trajectory guidance. Additionally, the edge of the card which is attached to the front flap 11 of the card, need only be attached at a central portion of that edge by an additional protruding rectangular section 21, allowing spacers 22, 23 on either side of it. This type of attachment further reinforces the screen's 17 attachment to the back flap 12 of the card so that it is sufficiently rigid, and slightly bowed toward the print 18 by embossing or otherwise, so as to press the print against the screen 17 above it. Alternatively, an additional element 28 can be added to apply spring force between the back flap 12 and the image-card 18. As a second alternative, the image-card 18 may be spaced from the lenticular screen 17 whose focal point 29 is not touching the lenticular screen 17, itself. This is accomplished by an additional spacing frame 29 between the edges of image-card 17, and lenticular screen 17.

Ordinarily, because of the thickness of the inner assembly, the front flap 11 would not be able to close to a position completely parallel to the back flap 12. Therefore, a sharp bend 24 in the front flap 11 is made just the same distance from its hinge-point 13 as the thickness of the inner assembly, thus allowing it to close completely. Also, the top edge of the lenticular screen 17 must be a short distance 27 from the hinge-point 13, in order that the image-card 18 can be hinged to the front flap 11 at not too sharp an angle, so as to slide unimpeded.

Figure 4:
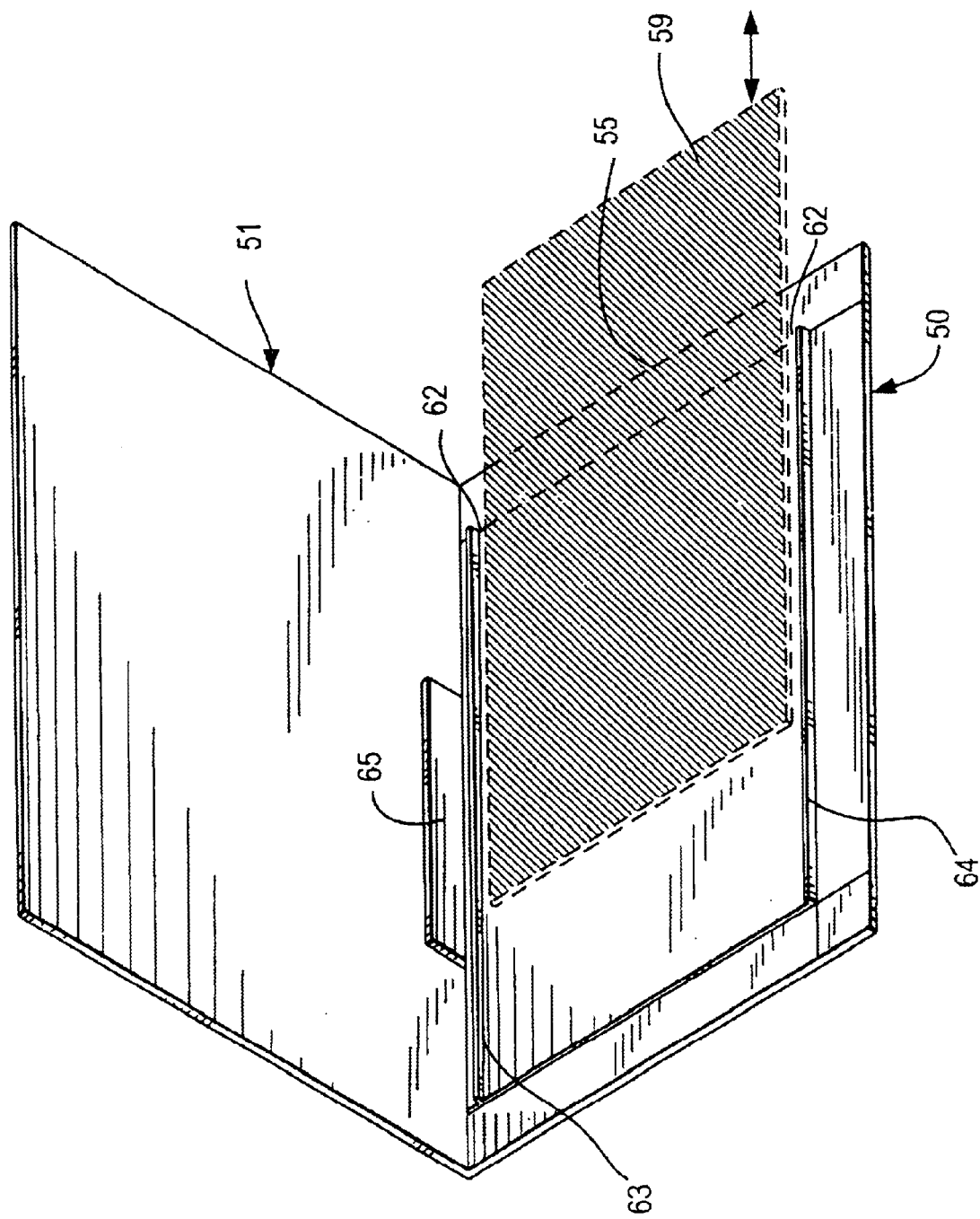
FIG. 4 shows a perspective view of a replaceable-image folding card according to a second embodiment of the present invention.

As shown in FIGS. 3 and 4, in a second embodiment, the first embodiment is modified to create a replaceable-image folding card 50, or card-viewer, with which to sequentially display any number of separate image-cards 59. In this case, the hinged, lenticular image-card 18 is replaced by a very thin, sliding tray 58. A separate, lenticular image-card 59, printed on paper or plastic or the like, of the same thickness as the walls of the tray 58, just fits within the walls' confines, and is therefore moved by the tray 58 under the lenticular screen 57, as in the first embodiment. A center portion 65 of the tray 58 is attached to the front flap 51 so that when the front flap 51 is opened by a user, the tray 58 is moved.

Figure 9:
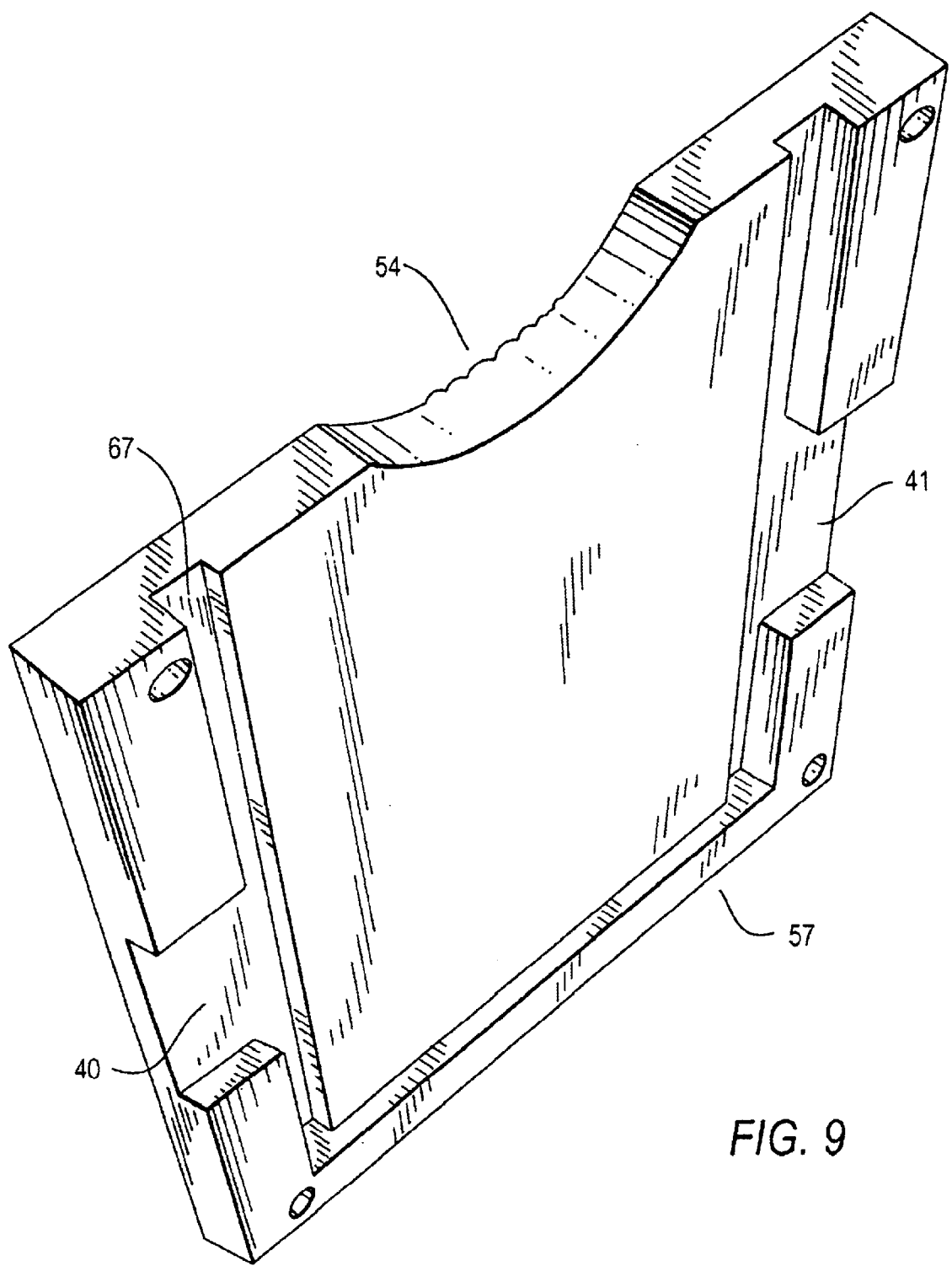
FIG. 9 shows a perspective view of a lenticular screen according to the present invention.

The tray has one of its side walls and a corresponding spacer 55 left out, leaving a gap 62 through which different cards 59 may be inserted into the tray 58, between its top and bottom walls 63, 64. The edge of the replaceable image-card 59 may extend outside the viewer, or a notch 54, as shown in FIG. 9, may be cut in the viewer 50, so the image card 59 may be grasped easily by a thumb and forefinger of a user.

Pre-printed cards 59, which fit the viewer 50 exactly, may be sold individually, or in packs. Also, with such a system, the user may print cards 59 on ordinary computer equipment, as the size of the printed card 59 will match standard paper sizes, such as an A6 index card (105×148 mm), or compatibly sized cards 59 can be manufactured for printing. Images may be sold on CD ROM or other media, downloaded via the Internet, or created with compatible software. In addition, images may be created photographically in a darkroom, or from a Polaroid-type camera, which has been modified so as to produce compatible images (as described in U.S. Pat. No. 6,115,101 to Kainen).

There is a tendency for thin cards 59 to slip between the screen 57 and the top of the tray walls 63, which just touch the underside of the lenticular screen 57. To avoid this, the underside of the screen 67 is recessed, or cut away entirely, and the walls 65 of the tray 58 made higher, so that the edge of the card 59 touches the tray wall 65 below its top edge, and cannot slip over it.

Additionally, in order to facilitate insertion of a card 59 into the tray 58, but still keep a tight fit, at least one of the top or bottom tray walls 63, 64 may be made as a spring, to push the edge of the image-card 59 against the other wall with enough force to hold the card 59 in place against the friction created when it slides under the lenticular screen 57.

The lenticular screen 57 may alternatively be made so that it hinges or snaps on and off the back flap 52, in order to replace the printed image 59 inside.

The lenticular screen 57 may be attached so that it pivots at one corner, and by turning a screw, or cam, at the opposite corner, the axis of the screen 57 may be adjusted to become co-linear with the image 59.

The spring-element 68, which pushes the surface of the card 59 (or page) against the screen 57, may be made by embossing raised areas in the back flap 52, or a corrugated extra piece of material, or by a cushion of synthetic animal fur, such as the kind manufactured by Draper Knitting Co., Inc., of Canton, Mass., which can be made at any thickness, and creates an all-over pressure, so that one area does not affect another area, and there is no "see-sawing" between adjacent areas. This all over pressure is especially useful for thin cards 59 or pages, or those which do not lay perfectly flat, such as a densely printed piece of ink-jet paper.

Figure 5A:
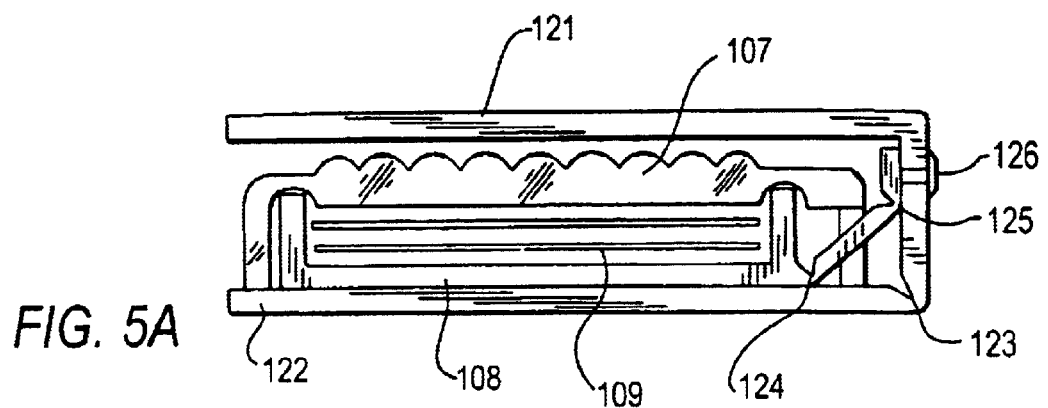
FIG. 5 shows a lenticular card/book case and a die cut panel according to a third embodiment of the present invention.
Figure 5B:
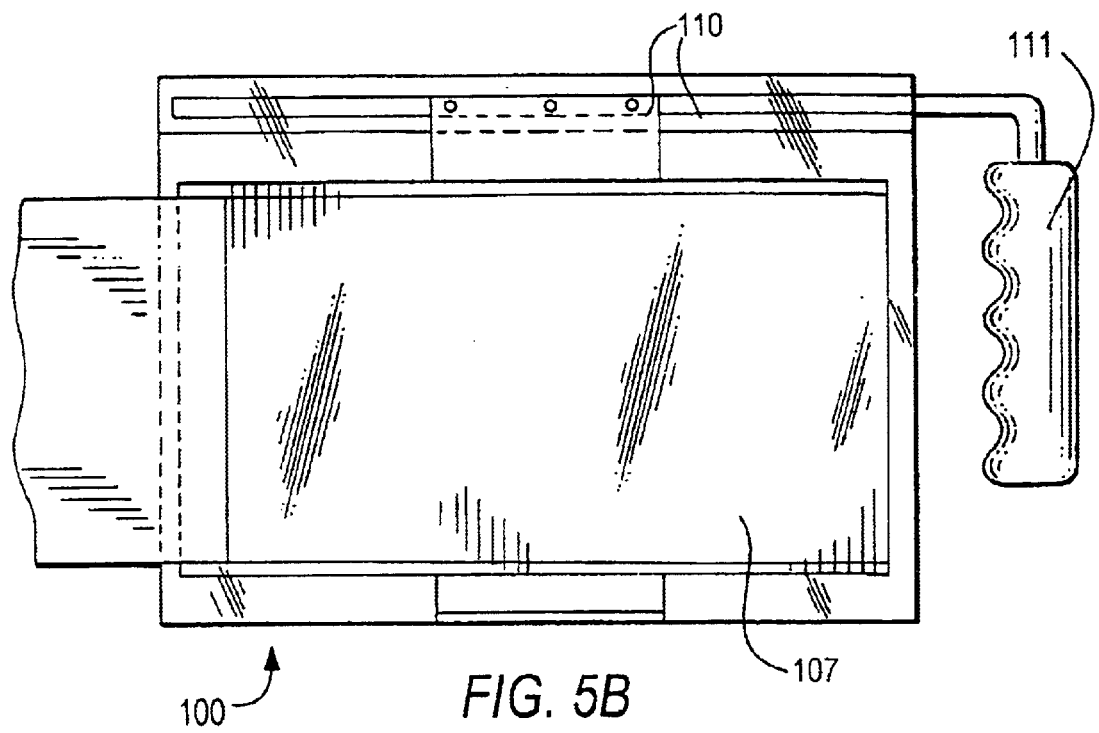
Figure 5C:
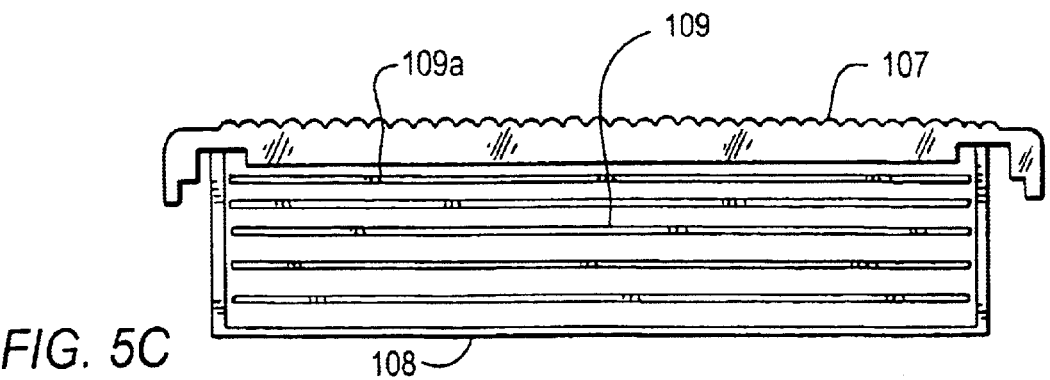

As shown in FIG. 5, in a third embodiment, which creates a card case or book case 100, the depth of the moveable tray 108 is made deeper, accommodating a number of cards or pages 109 to be fit into the tray 108 at once, with only the top card 109a in contact with the lenticular screen 107. The cards 109 may be spiral or otherwise bound, so that they can be flipped to any desired image, and re-inserted into the case 100. Moving the cover begins to be somewhat cumbersome in a larger size, and therefore a mechanical linkage 110 may be added so that a handle 111, located on one of the three sides of the case which does not accept the pages, is turned or squeezed, so as to move the tray 108 and pages 109 within, against the underside of the lenticular screen 107 as before, achieving the same effects.

Figure 10A:
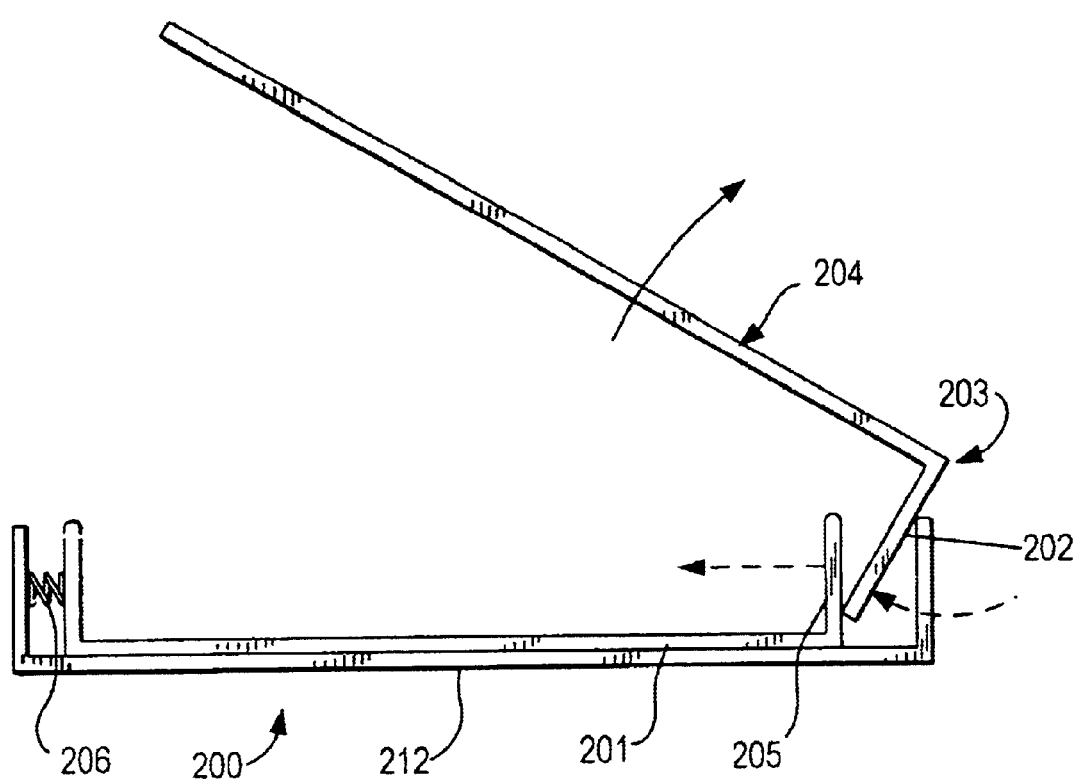
FIG. 10 shows a lenticular card viewer/book according to the present invention.
Figure 10B:
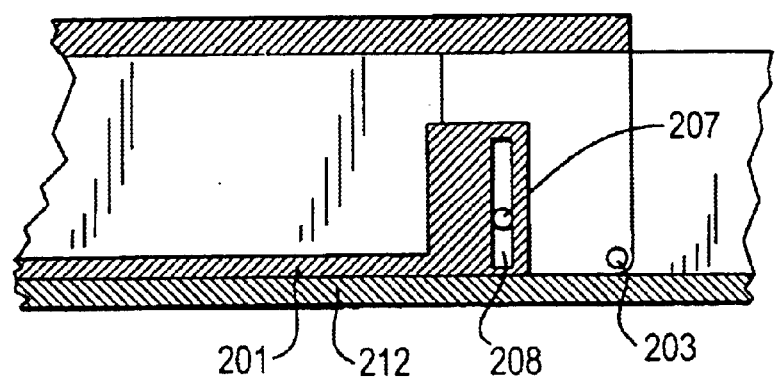
Figure 10C:
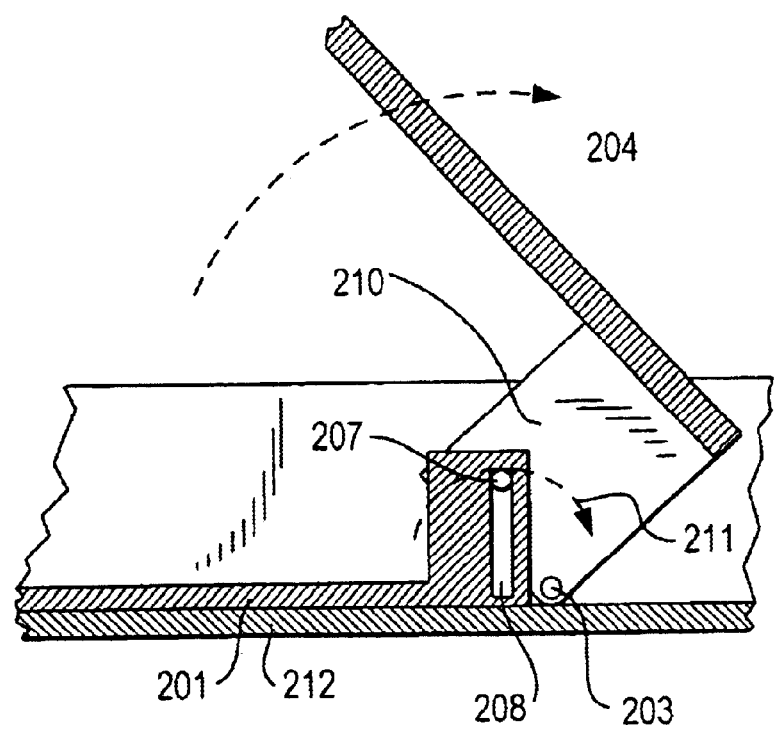
Figure 11A:
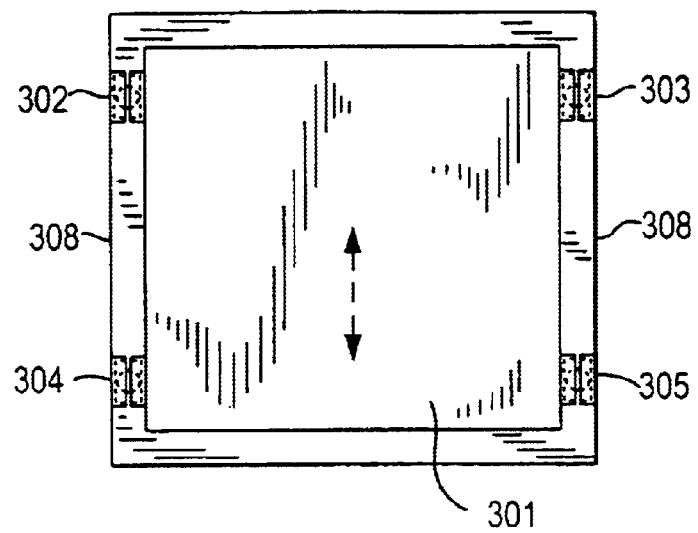
FIG. 11 shows a lenticular card viewer/book according to the present invention.
Figure 11B:
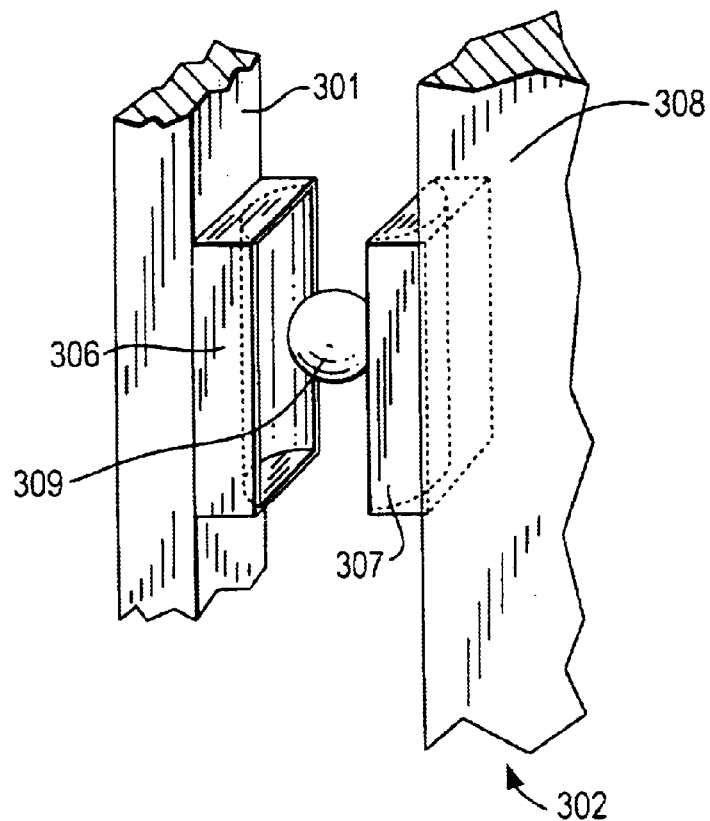

As shown in FIG. 10, the card case, or book case 200 may also move the tray 201 by means of a cam or other downward protrusion 202 from the hinged edge 203 of te top flap 204, which pushes against the top tray wall 205, forcing the tray against a spring 206. Alternatively, the tray 201 may be moved by a pin 207, which engages a vertical slot 208 close to the end of each side tray wall 209. The pin 207 protrudes inwards from a side wall, or section of side wall 210, which is attached to, and perpendicular to the top flap 204, and coplanar with the tray wall 209. As the top flap 204 rotates about its hinge point 203, the pin 207 describes an arc 211, pulling the tray 201 with it, and over the bottom flap. In a fourth embodiment, FIG. 11 shows a lenticular book or card viewer 300, whose tray 301 is guided by four ball bearings 302, 303, 304, 305, which are attached or molded into each corner, or near each corner of tray 302. A single bearing assembly 302, whose opposing races 306, 307 are attached to tray 301 and bottom flap wall 308, respectively. A single ball 309, eliminates the need for ball cages.

In the above embodiments, as well as those that follow, friction may be reduced between print and screen by the application of a fine powder of zinc stearate, used by banks to reduce friction between new bills, and by conjurors to make playing cards slide easily over one another. For consumer use, a powder-puff type of pad could be used to apply the zinc stearate powder.

As shown in FIG. 6, in a fourth embodiment, a card case or book case 200 is created by a tray 208 into which the cards or pages 209 just fit. In contact with the top page is a lenticular screen 207, which slides over it, guided by inward lips 210, 211 along the top edges of parallel sides of the tray. The pages 209 are pressed up against the screen 207 by a spring-loaded platform under the pages. The book's cover 201 is hinged to the bottom of the tray 202 at one of its sides, and near its hinge-point 216 is attached a push-rod 215, which extends through a gap 217 in the tray wall 218, and is attached at its other end to a free edge of the lenticular screen 207, whose lenticules' long axis is perpendicular to its direction of motion. Thus, when the cover 201 is moved in an opening or closing motion, the screen 207 moves a much smaller distance over the top page of the book 200, creating a lenticular display. A right-angle bend 219 in the cover 201, allows the cover 201 to close to a position parallel to the plane of the book 200, as would an ordinary book cover. Just under one of the inward lips 211 in which the lenticular screen 207 rides, the tray wall is removed, allowing pages 209, which, if unbound, to be slipped from the top to the bottom of the stack, or, if bound, to be removed and re-inserted after flipping to another page.

Figure 7:
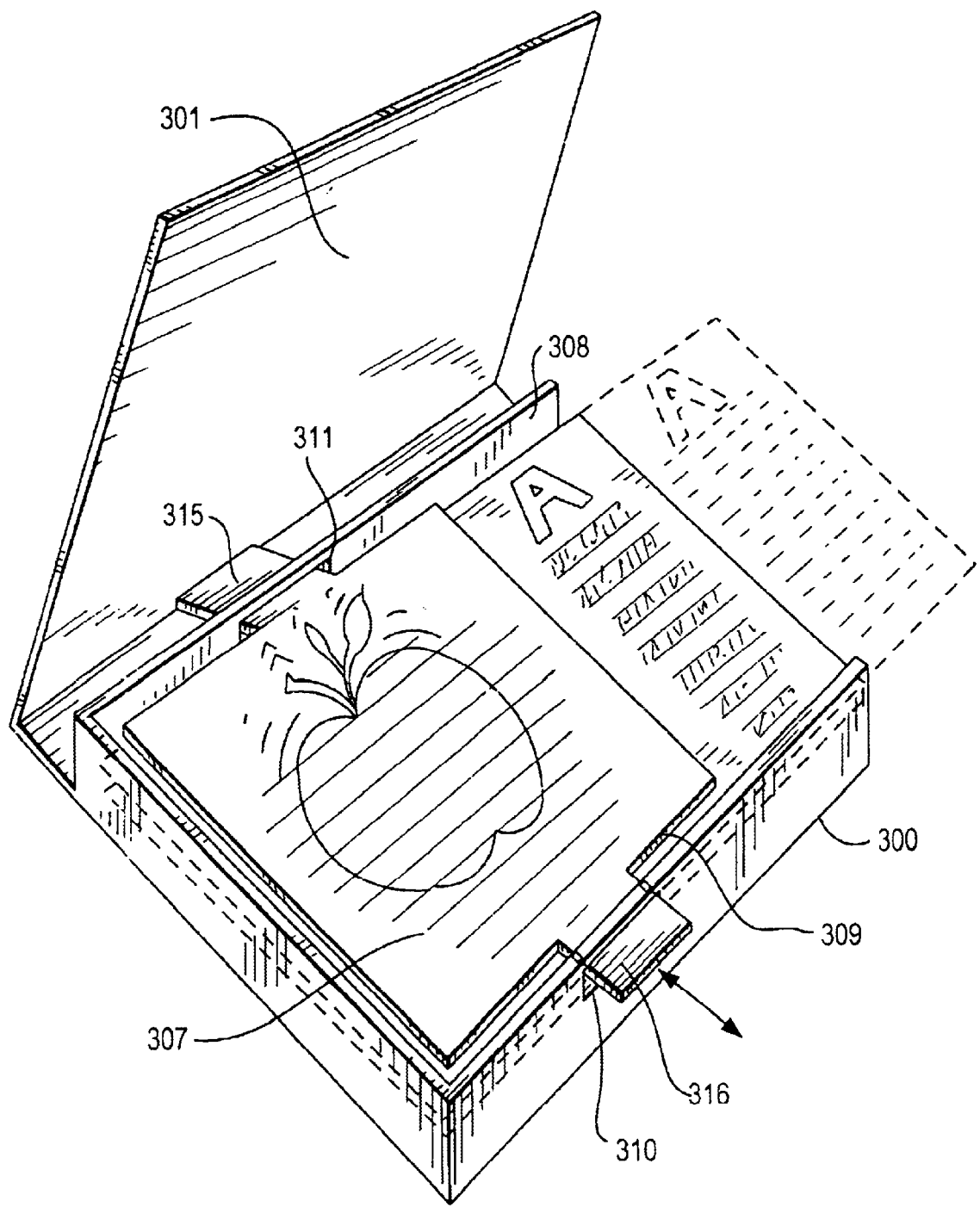
FIG. 7 shows a lenticular card/book case according to a fifth embodiment of the present invention.

As shown in FIG. 7, in a fifth embodiment, a card case or book 300 is created with a tray 308 as before, but two opposite sides of the tray 308 are broken by slots 310, 311. Projecting push-rods, or planes 315, 316, just fit through the slots 310, 311. One of the push-rods or planes 315 is hinged to a free edge of a lenticular screen 307, which is thereby moved over the surface of the pages 309. The screen's trajectory is guided by the edges of the gaps 310, 311 against the push-rods 315, 316, rather than by a track in the sides of the tray. The pages 309 are pressed up against the screen 307 by a spring-loaded platform beneath the pages 309. One of the projecting push-rods or planes 315 is hinged as before, to the cover 301 of the book 300, and is moved as before to create the display. One wall of the tray 308 is left out, as before, to change pages 309. Here also, instead of the cover 301, a handle may be added to move the screen 307.

Figure 2B:
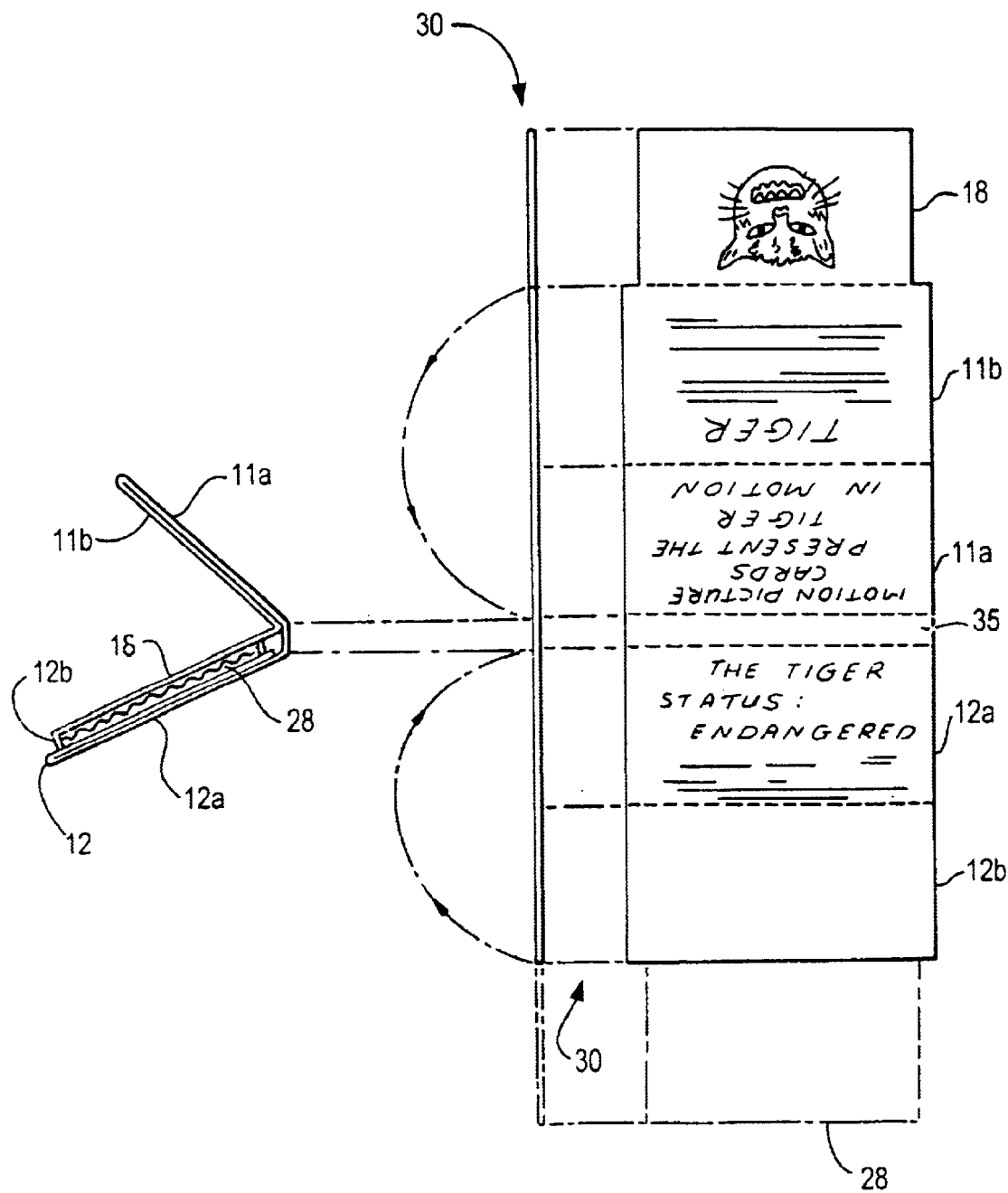

As shown in FIG. 2B, the folding card 10 may be constructed of paper or plastic by die-cutting a five-panel piece 30 from a larger sheet printed on one or both sides, and folded and glued automatically by a machine such as is made by Bobst Group, Inc. Two adjacent panels 11a, 11b would be folded and glued together to create the more rigid front flap 11. The following two adjacent panels 12a, 12b would also be folded and glued together to create the back flap 12, front and back flaps 11, 12 being separated by a thinner, rectangular "spine" section 35, which would serve to separate the flaps 11, 12 enough so they could close completely around the additional thickness of the lenticular screen 17 in between them. The fifth panel 18, hinged at the inner bottom 11b of the top flap 11, is printed with the lenticular image, and is made less wide than the flaps 11, 12, so that it slides underneath the lenticular screen 17. An optional sixth panel 28 may act as an additional spring element to push the print against the lenticular screen 17. The completed assembly then only needs the addition of the lenticular screen 17, which traps the image card 18 under it, as the screen 17 is attached around its edges. A ridge or other protrusion from the bottom of the screen 17 mates with a corresponding, female shape cut into the image card 18, so that alignment of the image card 18 and screen 17 is automatic. A die-cut piece of an existing lenticular extrusion, rather than a custom, injection-molded screen 17 may be used by cutting a female shape into the edges of the lenticular screen 17, and the corresponding male shapes engineered into the paper or plastic card 18. As shown in FIG. 5, the card viewer, card case or book case may be made as an injection-molded assembly, with hinged parts for a tray 108, a front flap 121, and a back flap 122. If molded of a suitable plastic, such as polypropylene, a living hinge 123 is created. The tray, having living hinges 124, 125, may also be molded separately so as to snap 126, or otherwise attach onto the inner front flap 121. These parts may also be molded or otherwise fabricated, using conventional hinging methods.

Figure 8:
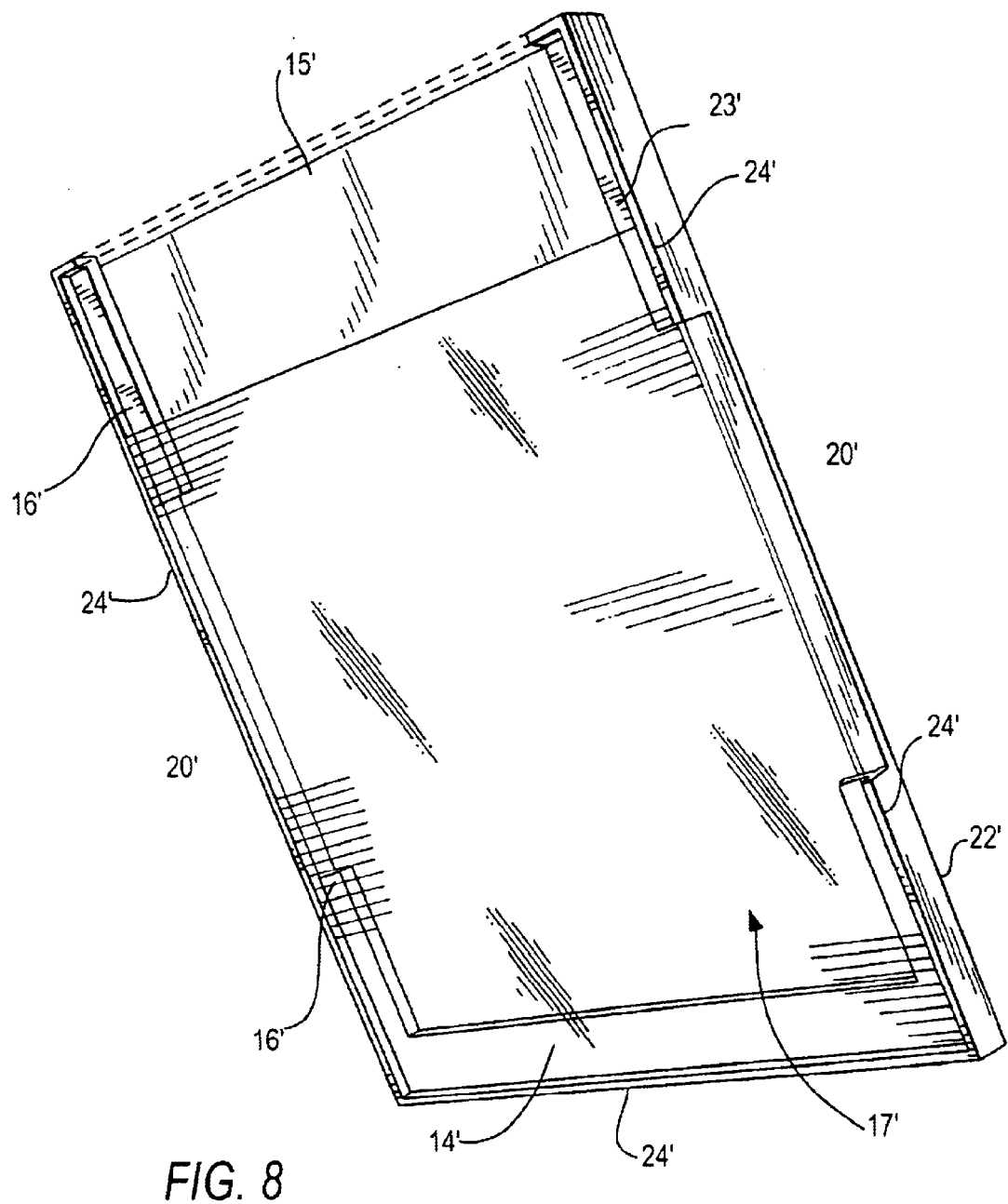
FIG. 8 shows a perspective view of a lenticular screen according to the present invention.

FIG. 8 shows a lenticular screen 17', including top spacers 22', 23', bottom spacers 16', 16" and a side spacer 14' molded to the lenticular screen 17'. to mate with the bottom flap of card or book, a ridge 24 runs around the edge of the lenticular screen 17', which also includes gaps 20' for receiving protrusions from an image card or tray and gap 15' showing an omitted spacer leaving space for insertion of an image card, as in the replaceable-image folding card 50.

FIG. 9 shows a lenticular screen 57, including a recessed area 67, gaps 40, 41 for receiving protrusions from an image card or tray and a notch 54 for providing easy gripping of a card 59 with the thumb and forefinger of a user.

The preferred embodiments described above are illustrative of the invention, which is not limited to the embodiments described. Various changes and modifications may be made in the invention by one skilled in the art without departing from the spirit or scope of the invention.

What is claimed is:

1. A replaceable image folding card display, comprising:
   a front flap;
   a back flap hinged to the front flap;
   a lenticular screen;
   a side spacer and a bottom spacer secured between the lenticular screen and an inner surface of the back flap, whereby a sleeve is formed; and
   a thin sliding tray, for housing a replaceable image card, positioned in the sleeve and attached to one of an inner surface of the front flap or a handle, whereby when the front flap is opened or the handle is moved, the tray is pulled underneath the lenticular screen.

2. The replaceable image folding card display according to claim 1, wherein the tray includes one open side to allow insertion and removal of the replaceable image card and a top wall, a bottom wall and a side wall to secure the replaceable card.

3. The replaceable image folding card display according to claim 2, wherein one of the top or bottom walls is spring loaded to push the edge of the replaceable image card against an opposing wall.

4. The replaceable image folding card display according to claim 1, wherein a center portion of a top edge of the tray is attached to one of the inner surface of the front flap or the handle.

5. The replaceable image folding card display according to claim 4, further comprising top spacers secured to the inner surface of the back flap and positioned on either side of the center portion.

6. The replaceable image folding card display according to claim 5, wherein the side, bottom and top spacers are molded into the lenticular screen.

7. The replaceable image folding card display according to claim 1, wherein the front flap is opened by one of a user or a motor.

8. The replaceable image folding card display according to claim 1, wherein the handle is moved by one of a user or a motor.

9. The replaceable image folding card display, according to claim 1, wherein the spacers have an additional thickness to create space between the lenticular screen and the image-card's surface, so that it is disposed at the focal plane of the lenticular screen, whose focal plane is spaced from itself.

* * * * *